Sept. 30, 1947 S. E. HEYMANN 2,428,078
HEATER SYSTEM
Filed April 2, 1943 2 Sheets-Sheet 2
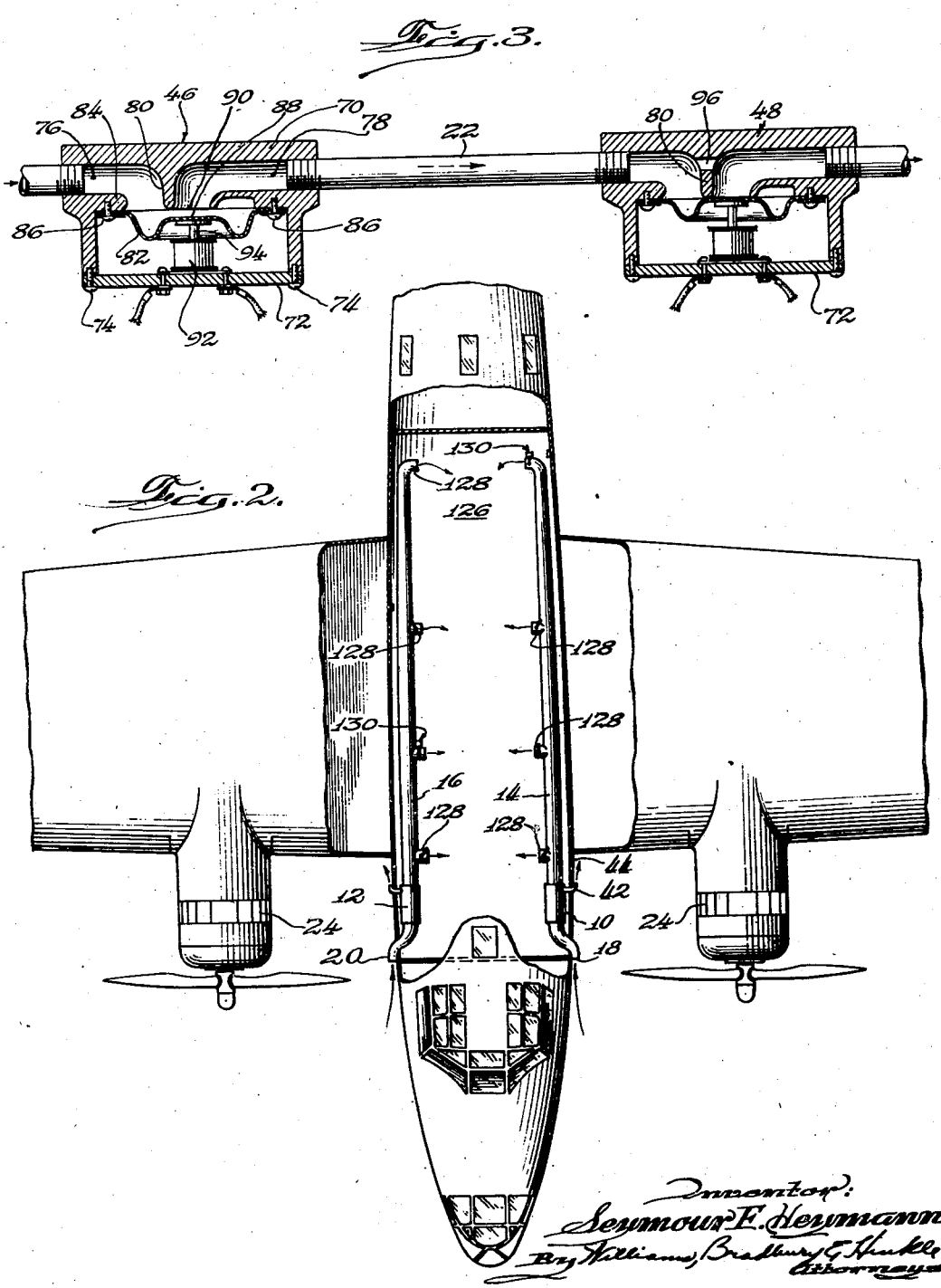

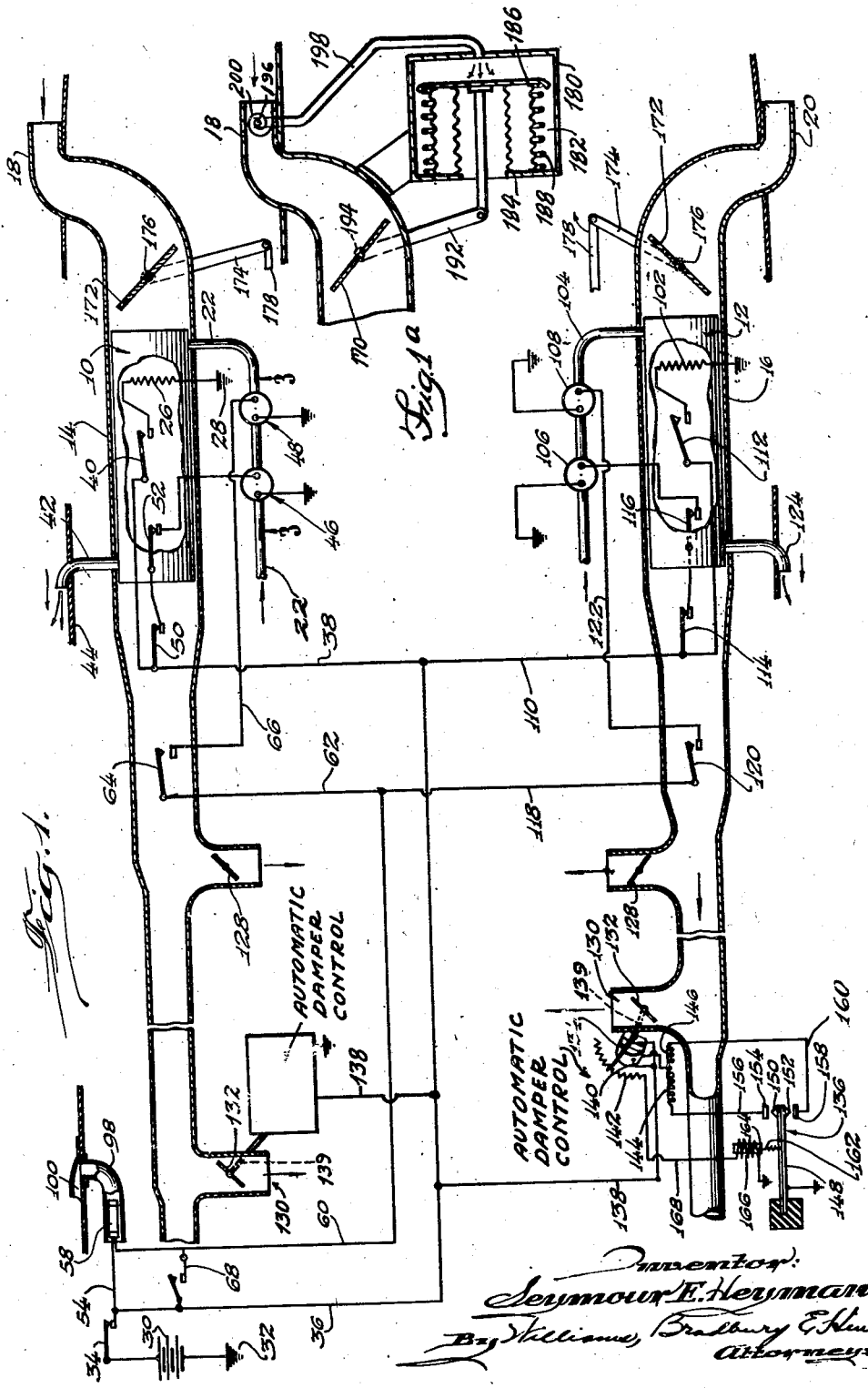

Patented Sept. 30, 1947

2,428,078

UNITED STATES PATENT OFFICE 2,428,078

HEATER SYSTEM

Seymour E. Heymann, Chicago, Ill., assignor to Stewart-Warner Corporation, Chicago, Ill., a corporation of Virginia Application April 2, 1943, Serial No. 481,554

2 Claims. (Cl. 237—2)

My invention relates to heater systems which are particularly designed for, but not limited to, use in aircraft.

An object of my invention is to provide a new and improved heater system for controlling the heat output of an internal combustion type of heater.

Another object of my invention is to provide a new and improved heater system which is simple, efficient, inexpensive to install and which is adapted to control the heat output of one or more internal combustion heaters.

Another object of my invention is to provide a new and improved heater system which will effectively and automatically control the heat output of an internal combustion heater under all operating conditions.

Another object of my invention is to provide a new and improved heater system which is specially adapted for use on aircraft and which will effectively heat the aircraft cabin or other space or spaces under all operating conditions.

Other objects and advantages will become apparent as the description proceeds.

In the drawings:

Fig. 1 is a diagrammatic view of a heater system embodying my invention;

Fig. 1a diagrammatically illustrates a modification which may be incorporated in the device of Fig. 1.

Fig. 2 is a view showing a preferred installation of my heater system in an airplane; and Fig. 3 is a detailed, sectional view of the fuel control valves taken on the line 3—3 of Fig. 1.

The installation shown in Figs. 1 and 2 comprises a pair of internal combustion heaters 10 and 12 mounted respectively in ventilating air ducts 14 and 16 to heat air supplied to these ducts by rams 18 and 20 located outside of the fuselage of the airplane and directed forwardly so that operation of the plane forces air into these rams. Each of these ventilating air ducts may have one or more outlets discharging heated ventilating air into a single cabin or plurality of cabins or other spaces to be heated and the four outlets shown in the drawings for each of these ducts are to be considered as illustrative only.

The heater 10 is supplied with a combustible mixture of fuel and air by means of a fuel supply pipe 22 connected with a supercharger for one of the plane engines 24. The fuel supplied to the combustion chamber of the heater 10 is ignited by an electrical igniter 26 which is grounded as indicated at 28 and which is supplied with current from any suitable source, such as a battery 30 which is grounded at 32. The igniter 26 is connected with the battery 30 by a manually operated master switch 34, wires 36 and 38 and the usual thermostatic switch 40 which is affixed to the heater 10 and breaks the igniter circuit when the heater attains normal operating temperature. The hot products of combustion give up their heat to the usual heat exchanger (not shown) and are illustrated as being discharged to atmosphere through an exhaust pipe 42 passing through the cabin wall 44 and discharging toward the tail of the airplane so that operation of the plane tends to create a suction in this exhaust pipe.

The fuel supply for the heater 10 is controlled by a solenoid operated shut-off valve 46 and a solenoid operated bleed valve 48 located in the fuel supply line 22. The shut-off valve 46 is in a circuit including the battery 30, master switch 34, wires 36 and 38 and overheat switches 50 and 52. The switches 50 and 52 are normally closed when master switch 34 is closed and serve to hold the shut-off valve 46 in open position. The overheat switch 50 is a thermostatic switch which opens when the temperature of the ventilating air which has passed over the heater reaches an abnormally high temperature, such, for example, as 225°. The overheat switch 52 is the usual thermostatic switch attached to the heater itself and opening only when this heater reaches an abnormally high temperature.

The bleed valve 48 is connected to the battery 34 through master switch 34, wire 54, cabin thermostat 58, wires 60 and 62, duct thermostat 64 and wire 66. The duct thermostat 64 is a thermostatic switch which is responsive to the temperature of the heated ventilating air as it leaves the heater 10 and is set to open at any pre-selected temperature, such for example as 212° F. When it is desired not to use the cabin thermostat 58, a shunt switch 68 may be manually closed to short circuit this thermostat.

The shut-off valve 46 and bleed valve 48 are shown more clearly in Fig. 3. The shut-off valve 46 comprises a body 70 to which a cover 72 is attached by screws 74, or in any other suitable manner. The body provides a flood inlet 76 and a flood outlet 78 between which is located a partition 80. The movable valve member comprises a flexible diaphragm 82 attached to an annular flange 84 by screws 86 and having a movable disc-like portion 88 closes the circular inlet end open position shown to a position where this disc-like portion 8 closes the circular inlet end 90 of the outlet 78. The diaphragm 82 is biased toward closed position and is held in open position by a solenoid 92 having an armature 94 attached to the disc-like portion 88 of the flexible diaphragm.

The bleed valve 48 is identical with the shut-off valve 46, except that a restricted passage 96 is drilled in the partition 80 so that when the diaphragm is in the closed position shown in Fig. 3 the supply of combustible mixture passing to the heater is limited to the amount which can flow through the restricted passage 96 which may be made of any suitable size to give any desired operating characteristic. Since the bleed valve is otherwise identical with the shut-off valve, similar parts of the two valves bear identical reference characters. Solenoid shut-off valves like valve 46 are available on the open market and the bleed valve 48 can be easily made from such standard shut-off valve by simply drilling the passage 96 without disassembling the valve as received from the manufacturer.

The cabin thermostat 58 is preferably of the "Fenwall" type since this type of switch is particularly sensitive to slight variations in temperature and may be readily adjusted to maintain the cabin at any desired temperature, such, for example, as 65° F. The word "Fenwall" is the trade name of a commercial type of thermostatic switch wherein the contacts are mounted on bow shaped springs located inside of and extending lengthwise of a metal sleeve whose longitudinal expansion and contraction with temperature changes engages or disengages the contacts. This cabin thermostat is illustrated as being mounted in a tube 98 attached to and passing through a wall of the airplane cabin and communicating with an outlet 100 so formed that operation of the plane causes air to be drawn from the cabin through the tube 98 and discharged to atmosphere through outlet 100. This arrangement causes a constant flow of cabin air over the thermostat 58 and results in this thermostat responding immediately to changes in air temperature in the cabin.

The heater 12 is identical with the heater 10 and has an igniter 102 for igniting the combustible mixture supplied to this heater through a fuel supply pipe 104 which may be connected to the same engine supercharger as the fuel supply pipe 22 or to a different engine supercharger or other suitable source of combustible mixture. This fuel supply pipe 104 is provided with a shut-off valve 106 and bleed valve 108 which may be, respectively, identical with the shut-off valve 46 and bleed valve 48 previously described.

The igniter 102 is connected to the battery 30 by way of master switch 34, wires 36 and 110 and a thermostatic switch 112 which opens when the heater attains normal operating temperature. The shut-off valve 106 is connected to the battery 30 by master switch 34, wires 36 and 110 and overheat switches 114 and 116 which may be respectively identical with the overheat switches 50 and 52 previously described. The bleed valve 108 is connected with the battery 30 through master switch 34, wire 54, cabin thermostat 58, wires 60 and 118, duct thermostat 120 and wire 122. The duct thermostat 120 could be set to open at the same temperature as the duct thermostat 64 of heater 10.

Heater 12 is provided with the usual heat exchanger (not shown) and communicates with an exhaust pipe 124 through which products of combustion formed in the heater are discharged to atmosphere. In lieu of having the exhaust pipes 42 and 124 lead directly to atmosphere, they may lead into the supercharger inlets or may connect to a valve mechanism like that shown in my Patent No. 2,400,509, issued May 21, 1946, for selectively discharging these products of combustion either to atmosphere or to a supercharger inlet, depending upon whichever is most desirable for a particular operating condition.

In Fig. 2, I have illustrated my invention as being applied to a military type of plane in which all of the heated ventilating air is discharged into a single cabin 126 and each of the ventilating air ducts 14 and 16 is illustrated as being provided with four outlets located in this cabin, although it will, of course, be understood that the number and arrangement of outlets may be varied as desired. Where all of the outlets are located in the same cabin, it is usually sufficient to provide each outlet with a manually controlled damper, as indicated by reference character 128 in Figs. 1 and 2. In commercial planes, however, it is customary to divide the available cabin space into a plurality of separate or semi-independent rooms or sections and under these conditions it may be advisable to provide one or more of the ventilating air outlets with an independent thermostatic control automatically to regulate the ventilating air discharged through such outlet in accordance with the temperature conditions existing in the particular room or section into which this outlet discharges.

In Figs. 1 and 2, I have indicated such automatically controlled outlets by reference character 130. Each outlet 130 is provided with a damper 132 whose position is determined by a small proportioning motor 134 under the control of a room or section thermostat 136, the motors being preferably supplied with current from the battery or other current source 30 by way of the master switch 34 and wires 36 and 138. These control motors are standard articles of commerce, one type being supplied by the Barber-Colman Company of Rockford, Illinois, so that a brief description of the operation of these controllers will suffice.

In general, the mode of operation of these controllers or control motors is such that they automatically continuously cause the valve or damper to which they are connected to assume a desired position so as to maintain constant some certain temperature or barometric pressure. As an example, the motor 134 is of the series wound type and is connected to drive through speed reduction gearing and output shaft 139 connected to the damper 132. The output shaft is also connected to the swinging arm 140 of a variable resistor, the arm at its free end contacting a resistance coil 142. One of the motor armature brushes is connected to wire 138 and this wire is also connected to the swinging arm 140. The other armature brush is connected to the center of a split field, the two field coils being indicated by reference characters 144 and 146.

The above described portion of the controller comprises what is generally referred to as the receiving end of the circuit. The sending end of this circuit is attached to the wall of the room or section and comprises a thermostatic switch made up of a bi-metallic strip 148 which, at its free end, is equipped with upper and lower contacts 150 and 152. These contacts are so arranged that when the strip 148 flexes upwardly the contact 150 will be brought against a stationary contact 154 connected by a conductor 156 to the outer end of the field coil 144. Similarly, downward movement of the bi-metallic strip 148 brings the contact 152 against a fixed contact 158 connected by a conductor 160 to the outer end of the field coil 146. The strip 148 is biased in an upward direction to a varying degree by a coil spring 162 connected to a floating armature 164 of a solenoid 166. This solenoid is connected by wire 168 to the proper end of resistance element 142.

A controller, as above described, operates in the following manner. If the bi-metallic strip 148 is so positioned that an increase in temperature will cause it to flex downwardly, such a temperature increase will bring contact 152 against contact 158 to establish a circuit from battery 30 through master switch 34 and wires 36 and 138 to arm 140 and one end of the motor armature. The circuit continues through the armature and field winding 146 and will cause the motor to rotate in one direction.

At the same time this motor circuit is energized as above described, current will flow through resistor arm 140, a portion of resistance coil 142, through conductor 168 and solenoid 166, thus energizing the solenoid 166 which tends to move armature 164 upwardly and increase the tension of spring 162. As the motor continues to operate when connected in the manner above described, rotation of shaft 138 will move the damper 132 toward open position and will also move resistor arm 140 in the same direction, thus decreasing the resistance of the variable resistor 142. This permits a greater current to flow through the solenoid 166 and increases the upper pull on bi-metallic strip 148. After the motor has continued to operate for the proper length of time, the pull of solenoid 106 will overcome the temperature bias of the bi-metallic strip 148 and separate contacts 152 and 158.

The flexing of bimetallic strip 148 to separate contacts 152 and 158 will bring contact 150 into engagement with contact 154 to establish a motor circuit through the other field coil 144 with the result that the motor rotates in the opposite direction and moves the damper 132 toward closed position while increasing the resistance of the variable resistor 142. This reduction in resistance decreases the strength of solenoid 166 and the upward pull of the spring on the bi-metallic strip 148. When the magnetic pull on this strip has been reduced some certain amount, the bi-metallic strip 148 will pull contact 150 away from contact 154. The motor continually fluctuates in its direction of movement and thereby maintains the damper 132 at approximately some predetermined position, depending on the temperature of the air surrounding the strip 148, it being appreciated that a decrease in the temperature surrounding the bi-metallic strip will cause this strip to flex downwardly more strongly, thus requiring that a greater proportion of the resistor 142 be removed from the circuit before the contact 152 will separate from the contact 158.

The various electrical circuits for the damper control motor 134 are illustrated as being grounded, as are all of the other electrical circuits of my novel heater system. It is to be understood, however, that these ground connections can be eliminated and return wires or other suitable conductors substituted therefor.

When the airplane is operating and the master switch 34 is first closed, the shut-off valves and bleed valves of both heaters will be open and full flow of combustible mixture will be supplied to the combustion chambers of the heaters where it will be ignited by the igniters 26 and 102. The hot products of combustion formed in the combustion chambers will pass through the heat exchange means of the heaters and give up its heat to ventilating air which enters rams 18 and 20 and flows through ducts 14 and 16 and over these heat exchange means. The cooled products of combustion are discharged through exhaust pipes 42 and 124 to atmosphere in the particular embodiment shown in the drawings.

As soon as the heaters attain normal operating temperature, thermostatic switches 40 and 112 open to disconnect the igniters 26 and 102 from battery 30, since the heaters, in accordance with usual practice, are so constructed that they maintain combustion without these igniters after the heaters have attained normal operating temperatures. Assuming that the dampers in the several outlets of the ducts 14 and 16 are open, the heated ventilating air flows through these outlets and into the cabin 126.

The continuous discharge of a small amount of air from the cabin through the tube 98 causes the cabin thermostat 58 to respond promptly to changes in cabin temperature. As soon as the temperature in the cabin reaches the temperature for which this thermostat is set, the contacts of the thermostat will separate, thereby breaking the circuit to the bleed valves 48 and 108 and reducing the supply of combustible mixture to the heaters 10 and 12. Thereafter the heaters 10 and 12 continue to operate at reduced output until the contacts of the cabin thermostat are again engaged by a drop in cabin temperature. As soon as this occurs, bleed valves 48 and 108 are opened and the heaters assume full output operation.

While under some conditions of operation the cabin thermostat 58 may control the bleed valves 48 and 108, under most operating conditions the opening and closing of these bleed valves will be regulated by the duct thermostats 64 and 120. Preferably the ventilating air passing over the heaters 10 and 12 is heated to a uniform temperature such, for example, as 212° F. under all conditions of operation and is supplied at this temperature to the cabin or other spaces to be heated. The temperature of this heated ventilating air is preferably so selected that a person close to one of the outlets of the ducts 14 and 16 will not receive a blast of extremely hot air and the heating system is so designed that its capacity for heating and ventilating air to this temperature is sufficient to satisfy the maximum heat requirements of the cabin or other space to be heated and where the heat requirements of the cabin or other space or spaces are less than maximum, the dampers 128 and 132 are positioned to reduce the flow of ventilating air into the cabin or other space.

In order to maintain the temperature of the heated ventilating air at almost exactly 212°, the duct thermostats 64 and 120 are preferably of the "Fenwall" type to afford the desired nicety of temperature control. Under normal operating conditions, the dampers 128 and 132 will restrict the flow of ventilating air over the heaters to such an extent that full operation of these heaters heats this ventilating air higher than 212°. As soon as this occurs, duct switches 64 and 120 open, whereupon bleed valves 48 and 108 close and reduce the supply of combustible mixture to the heaters 10 and 12. This greatly reduces the heat output of these heaters and after a period of time the temperature of the ventilating air leaving these heaters drops below 212°, whereupon duct switches 64 and 120 close and full heater operation is resumed.

The periods between successive full heater operations will vary, depending upon the temperature of the atmospheric air supplied by the rams 18 and 20 and also with the volume of this air passing over the heaters. When the atmospheric air is relatively warm and the heat requirements of the cabin relatively small, the dampers 128 and 132 will be almost closed and little air will flow over the heaters. Under these conditions, the heaters will operate for relatively long periods of time on reduced fuel supply and for relatively short periods of time on full fuel supply. On the other hand, where the atmospheric temperature is low and cabin heat requirements are high, the periods of particular fuel operation will be relatively short as compared with the periods of full fuel operation.

A feature of my invention lies in the fact that any person can open or close his particular outlet to any desired extent without interfering with the heat supplied through the other outlets. The duct thermostats 64 and 120 maintain the heated ventilating air at substantially 212° for all rates of ventilating air flow and the temperature of the ventilating air supplied through one outlet is not affected by opening or closing the other outlets. Whenever the control exercised by the cabin thermostat is not desired, this control can be eliminated by closing the shunt switch 68. When this switch is closed, the heat output of the heaters is controlled entirely by duct thermostats 64 and 120 under normal operating conditions.

If all of the dampers 128 and 132 are closed so that there is very little flow of ventilating air over the heaters, the temperature of this ventilating air will soon reach 212° and open duct switches 64 and 120. This will close bleed valves 48 and 108 and reduce the fuel supply to the heaters. Even this reduced fuel supply may produce heat sufficiently to open one or both of the overheat switches associated with each heater for controlling its shut-off valve and as soon as these overheat switches open, shut-off valves 46 and 106 stop all fuel supply to the heaters 10 and 12. If the main switch 34 remains closed, the heaters will re-start as soon as the open overheat switches have cooled down sufficiently to close. Such further heater operation will continue only long enough again to open the overheat switches and shut down the heaters. Such intermittent operation of the heaters will continue as long as the main switch remains closed and the dampers unduly restrict the flow of ventilating air over the heaters.

From the foregoing, it will be apparent that the heater system thus far described has a wide flexibility of operation to heat the requirements of widely different operating conditions. The mass and temperature of the ventilating air supplied to the heaters by the rams 18 and 20 will vary with the speed of the airplane and the temperature of the atmosphere through which it is traveling. Under almost all conditions of airplane operation, the heating system which I have thus far described is capable of meeting the heat requirements of the airplane cabin or other space, irrespective of the variations in mass and temperature of the ventilating air supplied by the rams 18 and 20, so that no means need be provided to regulate the volume of air supplied by these rams.

The one exception occurs when the airplane is operating at slow speed and high altitudes where the atmospheric air is extremely cold. Under these conditions, the cabin requires a maximum amount of heat, but the volume of air passing over the heaters is reduced by the decreased density of the atmospheric air. The decreased flow of ventilating air over the heaters may be insufficient to absorb the full heat output of the heaters without rising to a temperature above 212° and thereby opening the duct switches 64 and 120 and reducing the fuel supply to the heaters. In order to meet this particular condition, the ducts 14 and 16 are provided with dampers 172 which may normally remain in fixed position wherein they prevent the rams 18 and 20 from supplying maximum air to the heaters. Only when the airplane is operating slowly at extremely high altitudes and in extremely cold atmosphere is it necessary to shift these dampers and then these dampers should be shifted to fully open position to permit maximum flow of air to the heaters 10 and 12. Since these dampers 170 and 172 may remain in partially closed position except under special operating conditions which are rarely encountered, it is sufficient to provide a manual control for such dampers, although an automatic control may be provided if desired as illustrated in Fig. 1a.

The damper 172 is illustrated as having a suitable manual control comprising an arm 174 attached to the damper shaft 176 and an operating link 178 pivoted to the free end of the arm 174. The operating link 178 may be provided with any of the usual handles, buttons, or other suitable manual controls. The damper 170 of Fig. 1a, however, is illustrated as being provided with an automatic control which may be substituted for the manual control of Fig. 1.

The damper 170 is operated by mechanism which is responsive to variations in temperature and altitude. This mechanism comprises a housing 180 enclosing an annular bellows 182 which comprises an outer bellows member and an inner bellows member which are attached to the end plate 184 of the housing 180 at one of their ends and to a movable disc at their opposite ends. The space between the outer and inner bellows members is evacuated and fluid pressure in the housing 180 tends to move the disc 186 attached to the bellows 182 toward the end plate 184. A spring 188 is interposed between the disc 186 and end plate 184 and tends to expand the bellows 182. Movement of the disc 186 shifts the position of the damper 170 through a rod 190 attached to the disc 186 and pivoted to an arm 192 affixed to the damper shaft 194.

Part of the air entering the ram 18 enters the inlet end 196 of a Pitot tube connected by a pipe 198 to the housing 180 whereby the pressure of the air at the inlet end of this Pitot tube is communicated to the housing 180 and acts upon the bellows 182. The Pitot tube 196 has its inlet end swiveled so that its inlet end may point directly forward or at an angle, as shown in Fig. 1. A spirally wound bimetallic strip 200 has one end attached to a wall of the ram 18 and another end attached to the swiveled portion of the Pitot tube 196 whereby the angular position of the inlet end of the Pitot tube varies with the temperature. The pressure in housing 180, therefore, varies with the temperature and mass of air supplied to the heater 10 and acts to open the damper 170 when this temperature is low and this mass is small. The swivel arrangement of the Pitot tube and its thermostatic control is claimed in the co-pending application of Lynn A. Williams, Jr., Serial No. 473,786, filed January 28, 1943.

While I have illustrated and described a heater system which is especially designed and particularly adapted for use on airplanes and other aircraft, this heater system is not necessarily limited to such use, but may be applied to other purposes. This heater system is an improvement on the heating apparatus described and claimed in my co-pending application, Serial No. 452,714, filed July 29, 1942. While in the instant application I have shown and described only a single embodiment of my invention, it is to be understood that my invention is not limited to the particular details shown, but may assume numerous other forms and that the scope of my invention is defined in the following claims.

1. In an aircraft heating and ventilating system of the type in which ventilating air is collected by a scoop or ram projecting into the air stream and in which the air thus collected is passed to the cabin by a duct and in which a liquid fuel burning heater having fuel supply means is arranged to heat the air passing through said duct; a control system comprising valve means for regulating the rate of heat output of said heater by regulating the rate of fuel flow through said fuel supply means, thermostatic means sensitive to the duct temperature downstream of said heater for controlling said valve means, said thermostatic means being set to a temperature lower than that normally attainable by said heater when operating at full heat output so that regardless of ram pressure conditions, ambient air temperature conditions or atmospheric pressure conditions, the duct air temperature downstream of said heater remains substantially constant, and separate thermostatic means sensitive to the cabin temperature for controlling said valve means, the last said thermostatic means being adapted to override the first said thermostatic means to reduce the temperature of the duct air downstream of said heater whenever the temperature in said cabin rises above a predetermined level and to return control of said duct temperature to the first said thermostat whenever the cabin temperature falls below substantially the same level, and damper means in said duct for regulating the pressure drop therethrough, said damper being arranged in partially closed position for low altitude operation, and means responsive to the mass rate of air flow through said duct for controlling said damper, the last said means being adapted to shift said damper so as to lower the pressure drop through said duct whenever the flow rate through said system drops below a predetermined level.

2. In an aircraft heating and ventilating system of the type in which ventilating air is collected by a scoop or ram projecting into the air stream and in which the air thus collected is passed to the cabin by a duct and in which a liquid fuel burning heater having fuel supply means is arranged to heat the air passing through said duct; a control system comprising valve means for regulating the rate of heat output of said heater by regulating the rate of fuel flow through said fuel supply means, thermostatic means sensitive to the duct temperature downstream of said heater for controlling said valve means, said thermostatic means being set to a temperature lower than that normally attainable by said heater when operating at full heat output so that regardless of ram pressure conditions, ambient air temperature conditions or atmospheric pressure conditions, the duct air temperature downstream of said heater remains substantially constant, and separate thermostatic means sensitive to the cabin temperature for controlling said valve means, the last said thermostatic means being adapted to override the first said thermostatic means to reduce the temperature of the duct air downstream of said heater whenever the temperature in said cabin rises above a predetermined level and to return control of said duct temperature to the first said thermostat whenever the cabin temperature falls below substantially the same level, and damper means in said duct for regulating the pressure drop therethrough, said damper being arranged in partially closed position for low altitude operation, and means responsive to the mass rate of air flow through said duct for controlling said damper, the last said means being adapted to shift said damper so as to lower the pressure drop through said duct whenever the flow rate through said system drops below a predetermined level, and the last said means including temperature responsive means sensitive to ambient air temperature for tending to shift said damper to increase the pressure drop through said system whenever the ambient air temperature drops below a predetermined minimum.

SEYMOUR E. HEYMANN.

REFERENCES CITED

The following references are of record in the file of this patent:

UNITED STATES PATENTS

| Number | Name | Date |
|---|---|---|
| 1,004,074 | Powers | Sept. 26, 1911 |
| 2,314,089 | Hess et al. | Mar. 16, 1943 |
| 2,092,655 | Page | Sept. 7, 1937 |
| 1,566,854 | Gold et al. | Dec. 22, 1925 |
| 2,155,371 | Anderegg et al. | Apr. 18, 1939 |
| 2,189,895 | Grutzner | Feb. 13, 1940 |
| 2,327,202 | McCollum | Aug. 17, 1943 |
| 2,009,823 | Van Vulpin | July 30, 1935 |
| 2,271,120 | Grant | Jan. 27, 1942 |
| 2,292,830 | Ganger et al. | Aug. 11, 1942 |
| 2,308,887 | McCollum | Jan. 19, 1943 |
| 2,193,141 | Price | Mar. 12, 1940 |
| 2,266,563 | McCorkle | Dec. 16, 1941 |
| 2,259,061 | Caffler | Oct. 14, 1941 |
| 2,367,162 | Whempner | Jan. 9, 1945 |
| 2,364,458 | McCollum | Dec. 5, 1944 |
| 2,330,298 | McCollum | Sept. 28, 1943 |
| 2,290,066 | Nessell | July 14, 1942 |
| 2,235,620 | Nessell | Mar. 18, 1941 |
| 2,067,426 | Stuart | Jan. 12, 1937 |
| 2,160,740 | Hutchins | May 30, 1939 |
| 2,022,879 | Carlberg | Dec. 3, 1935 |
| 2,109,862 | Kiechbaum | Mar. 1, 1938 |
| 2,188,775 | Locke | Jan. 30, 1940 |
| 2,403,917 | Gille | July 16, 1946 |
| 2,244,555 | Harris | June 3, 1941 |

Certificate of Correction

Patent No. 2,428,078.  September 30, 1947.

SEYMOUR E. HEYMANN

It is hereby certified that errors appear in the printed specification of the above numbered patent requiring correction as follows: Column 2, line 53, strike out the words "closes the circular inlet end" and insert instead *adapted to move from the*; line 55, for "portion 8" read *portion 88*; and that the said Letters Patent should be read with these corrections therein that the same may conform to the record of the case in the Patent Office.

Signed and sealed this 6th day of April, A. D. 1948.

[SEAL]

THOMAS F. MURPHY,
*Assistant Commissioner of Patents.*